US011395196B2

(12) United States Patent
Adachi

(10) Patent No.: US 11,395,196 B2
(45) Date of Patent: Jul. 19, 2022

(54) BASE STATION AND USER TERMINAL

(71) Applicant: KYOCERA Corporation, Kyoto (JP)

(72) Inventor: Hiroyuki Adachi, Kawasaki (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/991,799

(22) Filed: Aug. 12, 2020

(65) Prior Publication Data

US 2020/0374768 A1 Nov. 26, 2020

Related U.S. Application Data

(63) Continuation of application No. 16/189,555, filed on Nov. 13, 2018, now Pat. No. 10,772,014, which is a continuation of application No. PCT/JP2017/017847, filed on May 11, 2017.

(60) Provisional application No. 62/335,894, filed on May 13, 2016.

(51) Int. Cl.
*H04W 36/00* (2009.01)
*H04W 72/04* (2009.01)
(Continued)

(52) U.S. Cl.
CPC ..... *H04W 36/0058* (2018.08); *H04W 36/0072* (2013.01); *H04W 36/0077* (2013.01);
(Continued)

(58) Field of Classification Search
CPC ................ H04W 36/0058; H04W 36/0072
See application file for complete search history.

(56) References Cited

U.S. PATENT DOCUMENTS 9,788,248 B2 10/2017 Ke et al.
10,440,670 B2 * 10/2019 Park ..................... H04W 36/30
(Continued)

FOREIGN PATENT DOCUMENTS

WO 2016/002060 A1 1/2016

OTHER PUBLICATIONS

NTT DOCOMO, "Enhancements for PC5-based V2x synchronization", 3GPP TSG RAN WG1 Meeting #82bis, R1-155876, Malmo, Sweden, Oct. 5-9, 2015, pp. 2-5.
(Continued)

*Primary Examiner* — Chandrahas B Patel
(74) *Attorney, Agent, or Firm* — Studebaker & Brackett PC

(57) ABSTRACT

A user equipment and method of a user equipment transmit, to a first cell, information requesting radio resource for V2X sidelink communication, and receive from the first cell, a message for a handover from the first cell to a second cell. The message includes information indicating a resource pool used for transmitting the V2X sidelink communication during performing the handover, and synchronization information indicating synchronization configuration used for transmitting synchronization in the V2X sidelink communication during performing the handover. A base station receives the information requesting radio resource for V2X sidelink communication and transmits to the user equipment, a message for a handover from a first cell to a second cell. The message transmitted by the base station includes information indicating a resource pool used for transmitting the V2X sidelink communication, and synchronization information indicating synchronization configuration used for transmitting synchronization in the V2X sidelink communication.

10 Claims, 10 Drawing Sheets

(51) Int. Cl.
  *H04W 72/02* (2009.01)
  *H04W 56/00* (2009.01)
  *H04W 36/08* (2009.01)
  *H04W 36/38* (2009.01)
  *H04W 4/46* (2018.01)
  *H04W 92/18* (2009.01)

(52) U.S. Cl.
  CPC .......... *H04W 36/08* (2013.01); *H04W 36/38* (2013.01); *H04W 56/00* (2013.01); *H04W 72/02* (2013.01); *H04W 72/04* (2013.01); *H04W 4/46* (2018.02); *H04W 92/18* (2013.01)

(56) References Cited

U.S. PATENT DOCUMENTS

| | | | |
|---|---|---|---|
| 10,575,224 B2 * | 2/2020 | Belleschi | H04W 36/0072 |
| 2015/0282210 A1 | 10/2015 | Li et al. | |

OTHER PUBLICATIONS

3rd Generation Partnership Project; "Technical Specification Group Radio Access Network; Evolved Universal Terrestrial Radio Access (E-UTRA) and Evolved Universal Terrestrial Radio Access Network (E-UTRAN)"; 3GPP TS36.300 V13.3.0; Mar. 2016; pp. 1-295; Release 13; 3GPP Organizational Partners.

Ericsson; "Sidelink Resource Allocation in V2X"; 3GPP TSG-RAN WG2 #93-bis; R2-162818; Apr. 11-15, 2016; pp. 1-7; Dubrovnik, Croatia.

Samsung; "Introducing eSL"; 3GPP TSG-RAN2 Meeting #82; R2-156216; Nov. 16-20, 2015; pp. 1-37 Anaheim, CA, USA.

Kyocera; "Consideration of Sidelink Synchronization on V2V Mobility"; 3GPP TSG RAN WG2 Meeting #94; R2-164064; May 23-27, 2016; pp. 1-5; Nanjing, China.

ZTE, "Discussion on the remaining issues on V2V mobility", Agenda item: 8.2.2, 3GPP TSG-RAN WG2 Meeting #95, R2-165233, Goteborg, Sweden, Aug. 22-26, 2016, 4 pages.

* cited by examiner

BASE STATION AND USER TERMINAL

CROSS-REFERENCE TO RELATED APPLICATION

The present application Continuation of U.S. patent application Ser. No. 16/189,555 filed Nov. 13, 2018, which is a continuation based on PCT Application No. PCT/JP2017/017847 filed on May 11, 2017, which claims the benefit of U.S. Provisional Application No. 62/335,894 (filed May 13, 2016). The content of which is incorporated by reference herein in their entirety.

FIELD

The present disclosure relates to a base station and a user terminal used in a communication system.

BACKGROUND

In 3GPP (3rd Generation Partnership Project), which is a project aiming to standardize a mobile communication system, the specifications of proximity-based services (ProSes) have been designed (see Non Patent Document 1).

PRIOR ART DOCUMENT

Non-Patent Document

Non Patent Document 1: 3GPP Technical Specification "TS 36.300 V13.3.0" Apr. 1, 2016

SUMMARY

A user equipment according to the present disclosure comprises a transmitter configured to transmit, to a first cell, information requesting radio resource for V2X sidelink communication, and a receiver configured to receive from the first cell, a message for a handover from the first cell to a second cell. The message includes information indicating a resource pool used for transmitting the V2X sidelink communication during performing the handover, and synchronization information indicating synchronization configuration used for transmitting synchronization in the V2X sidelink communication during performing the handover.

A user equipment according to the present disclosure can further comprise a controller configured to perform the handover in response to receiving the message, and a transmitter configured to transmit the V2X sidelink communication during performing the handover by using the resource pool indicated by the message.

A base station according to the present disclosure comprises a receiver configured to receive from a user equipment, information requesting radio resource for V2X sidelink communication, and a transmitter configured to transmit to the user equipment, a message for a handover from a first cell to a second cell. The message includes information indicating a resource pool used for transmitting the V2X sidelink communication during performing the handover, and synchronization information indicating synchronization configuration used for transmitting synchronization in the V2X sidelink communication during performing the handover.

A method according to the present disclosure comprises transmitting, by a user equipment to a first cell, information requesting radio resource for V2X sidelink communication, and receiving by the user equipment from the first cell, a message for a handover from the first cell to a second cell. The message includes information indicating a resource pool used for transmitting the V2X sidelink communication during performing the handover, and synchronization information indicating synchronization configuration used for transmitting synchronization in the V2X sidelink communication during performing the handover.

DESCRIPTION OF THE EMBODIMENT

Overview of Embodiment

Figure 1:
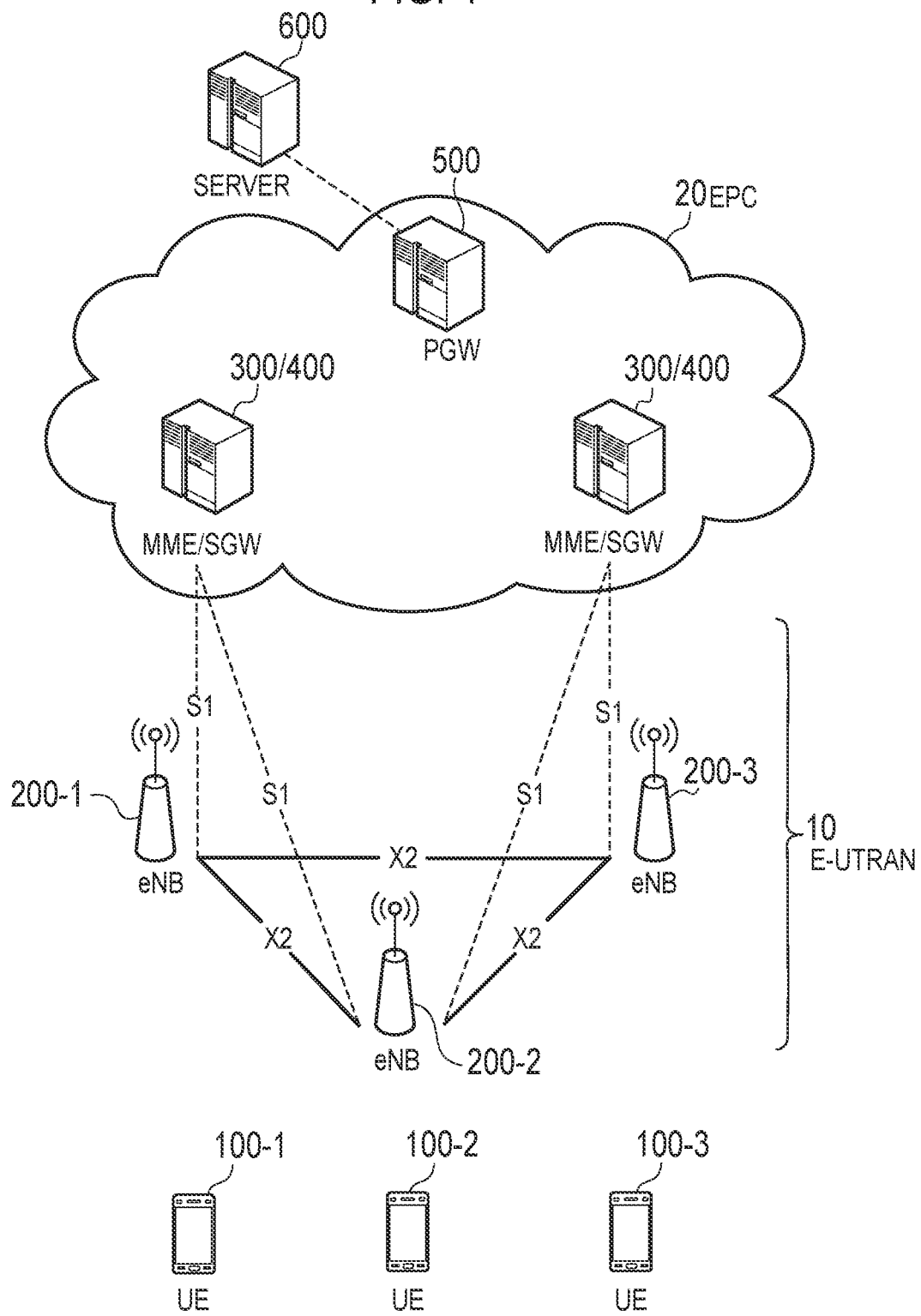
FIG. 1 is a diagram illustrating a configuration of an LTE system.

According to the current specifications, when a radio terminal is located in a cell, the radio terminal needs to execute the proximity-based service using a resource pool and synchronization setting information which are notified from the cell. Therefore, there is a possibility that the radio terminal configured to execute a handover needs to suspend the proximity-based service until receiving the resource pool and the synchronization setting information from the cell that is the handover target after the handover is completed.

A base station according to one embodiment may comprise: a controller configured to manage a first cell; and a transmitter configured to transmit to a radio terminal a message for a handover from the first cell to a second cell. The message may include information of a resource pool used for a proximity-based service in the second cell, and synchronization setting information for transmitting or receiving a synchronization signal in the proximity-based service in the second cell.

The synchronization setting information may include at least one of information related to transmission or reception timing of the synchronization signal and a parameter used for transmitting or receiving the synchronization signal.

The controller may control: a process of transmitting a first message of a request for the handover to another base station configured to manage the second cell, and a process of receiving from the other base station a second message for notifying the base station of approval of the request. The second message may include the information of the resource pool and the synchronization setting information.

The base station may further comprise a receiver configured to receive, from the radio terminal, predetermined information for notifying the base station whether the radio terminal has acquired the synchronization setting information.

The receiver may receive the predetermined information by a measurement report including a measurement result of a radio environment of the radio terminal.

The transmitter may transmit, to the radio terminal, measurement setting information related to a setting for transmitting the measurement report. The measurement setting information may include information indicating whether to permit the radio terminal to include the predetermined information in the measurement report.

The receiver may receive the predetermined information by a message used for providing sidelink information to the base station.

The controller may control: a process of transmitting a first message for requesting preparation of a resource for the handover to another base station configured to manage the second cell, and a process of receiving from the other base station a second message for notifying the base station of the prepared resource. The second message may include the synchronization setting information.

The base station may further comprise a receiver configured to receive, from the radio terminal, predetermined information for notifying the base station whether the radio terminal has acquired the synchronization setting information.

When the predetermined information indicates that the radio terminal has not acquired the synchronization setting information, the controller may include in the first message, the information of the resource pool and the predetermined information.

The controller may determine whether to include, in the message, the information of the resource pool and the predetermined information, depending on a type of the proximity-based service being executed by the radio terminal.

The controller may determine whether to include, in the message, the information of the resource pool and the predetermined information, according to information of a radio resource used for the proximity-based service by the radio terminal.

The base station may further comprise a receiver configured to receive information related to a situation of the radio terminal configured to execute the proximity-based service. The controller may determine, according to the information, whether to include, in the message, the information of the resource pool and the predetermined information.

A base station according to one embodiment may comprise: a controller configured to manage a first cell; and a transmitter configured to transmit to the radio terminal a list of synchronization setting information for transmitting or receiving a synchronization signal in a proximity-based service. The transmitter may transmit to the radio terminal a message for a handover from the first cell to a second cell. The message may include information of a resource pool used for the proximity-based service in the second cell and an index corresponding to predetermined synchronization setting information included in the list. The predetermined synchronization setting information may be used for transmitting or receiving the synchronization signal in the second cell.

The controller may share the list with another base station configured to manage the second cell. The transmitter may transmit the message including the index received from the other base station to the radio terminal.

The index may be a second index included in a second list that is a list of synchronization setting information provided in the second cell. The transmitter may transmit the list including the second index associated with the predetermined synchronization setting information to the radio terminal.

A radio terminal according to one embodiment may comprise a receiver configured to receive from a first cell, a message for a handover from the first cell to a second cell. The message may include information of a resource pool used for a proximity-based service in the second cell, and synchronization setting information for transmitting or receiving a synchronization signal in the proximity-based service in the second cell.

The synchronization setting information may include at least one of information related to transmission or reception timing of the synchronization signal and a parameter used for transmitting or receiving the synchronization signal.

The radio terminal may further comprise a transmitter configured to transmit, to the first cell, predetermined information for notifying the base station whether the radio terminal has acquired the synchronization setting information.

The transmitter may transmit the predetermined information by a measurement report including a measurement result of a radio environment of the radio terminal.

The receiver may receive, from the first cell, measurement setting information related to a setting for transmitting the measurement report. The measurement setting information may include information indicating whether to permit the radio terminal to include the predetermined information in the measurement report.

The transmitter may transmit the predetermined information by a message used for providing sidelink information to the base station.

A base station according to one embodiment may comprise: a controller configured to manage a second cell; a receiver configured to receive a first message for requesting preparation of a resource for a handover from another base station configured to manage a first cell; and a transmitter configured to transmit to the other base station a second message for notifying the other base station of the prepared resource. The second message may include synchronization setting information for transmitting a synchronization signal in the proximity-based service in the second cell.

A radio terminal according to one embodiment may comprise a receiver configured to receive, from a first cell, information of a first reception resource pool used for a proximity-based service in the first cell. The receiver may use the first reception resource pool to receive a radio signal of the proximity-based service. Even when the radio terminal receives a message for a handover from the first cell to a second cell, the receiver may use the first reception resource pool until acquiring a second reception resource pool used for the proximity-based service in the second cell.

(Mobile Communication System)

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a communication apparatus (radio terminal). The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like.

The "cell" is a combination of a downlink resource and an arbitrary uplink resource. The relation between the downlink carrier frequency and the uplink carrier frequency is indicated in the system information transmitted on the downlink resource. The "cell" may be used as a term indicating the minimum unit of a radio communication area. The "cell" may be used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300 and an SGW (Serving Gateway) 400

The MME 300 performs, for example, various kinds of mobility control for the UE 100. The SGW 400 performs, for example, data transfer control. The MME 300 and the SGW 400 are connected to the eNB 200 via a S1 interface. The PGW 500, for example, performs control of relaying user data from an external network (and to an external network).

A server 600 may be provided in the external network. The server 600 is, for example, a ProSe application server (ProSe Application Server). The server 600 manages identifiers used in ProSe.

Figure 2:
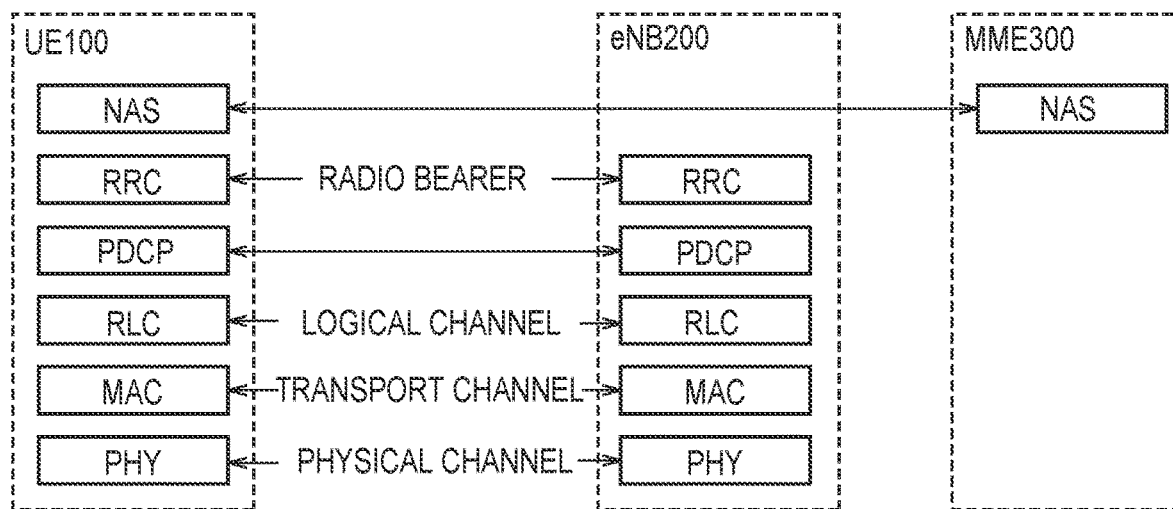
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
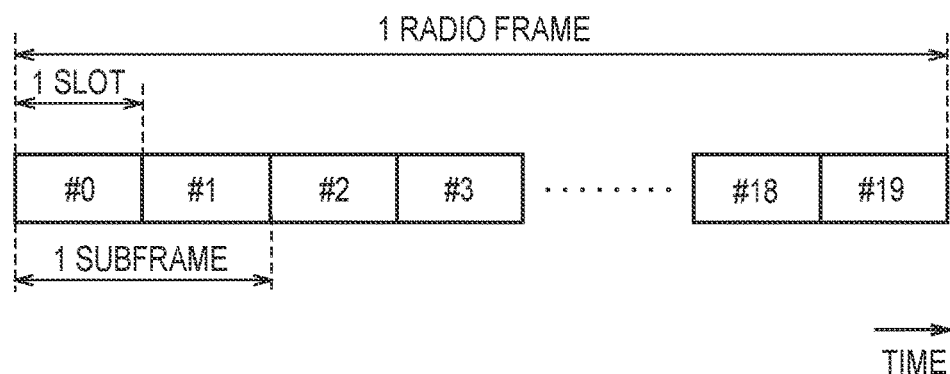
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

(Proximity-Based Service)

Proximity-based services (ProSes) will be described. The proximity-based service is a service that can be provided by a 3GPP system, based on communication devices (for example, UEs 100) in the vicinity of each other.

In the ProSe, various types of radio signals are transmitted and received via a direct radio link between nodes (for example, between UEs), without passing through the eNB 200. The direct radio link in ProSe is called "sidelink".

The sidelink may be an interface for sidelink communication and sidelink discovery (for example, an interface between a UE and a UE). The sidelink communication is a function (AS functionality) for enabling ProSe direct communication (hereinafter, appropriately referred to as "direct communication"). The sidelink discovery is a function (AS functionality) for enabling ProSe direct discovery (hereinafter, appropriately referred to as "direct discovery").

The sidelink corresponds to a PC5 interface. The PC5 is a reference point between ProSe usable UEs (ProSe-enabled UE) used for a control plane and a user plane for the ProSe direct discovery, the ProSe direct communication, and a ProSe UE-Network relay.

For modes of the ProSe, "direct discovery (Direct Discovery)", "direct communication (Direct Communication)", and "Relay" are defined. "Relay" will be described later.

The direct discovery is a mode of searching for a partner destination by directly transmitting, between the UEs, a discovery message (discovery signal) that does not specify a specific destination. The direct discovery is a procedure for discovering another UE in the vicinity of the UE by using a direct radio signal in E-UTRA (Evolved Universal Terrestrial Radio Access) via the PC5. Alternatively, the direct discovery is a procedure adopted by a UE 100 capable of executing the proximity-based service for discovering another UE 100 capable of executing the proximity-based service by using only a capability of the two UEs 100 with the help of the E-UTRA technology. The direct discovery is supported only if the service is provided to the UE 100 by the E-UTRAN (eNB 200 (cell)). The service can be provided by the E-UTRAN if the UE 100 is connected to the cell (eNB 200) or camps on the cell.

A resource allocation type for the transmission (announcement) of the discovery message (discovery signal) includes "Type 1" and "Type 2 (Type 2B)". In "Type 1", the UE 100 selects a radio resource. In "Type 2 (Type 2B)", the eNB 200 allocates a radio resource. In Type 1, the UE 100 may select a radio resource from resource pools provided by the eNB 200.

A "Sidelink Direct Discovery" protocol stack includes a physical (PHY) layer, a MAC layer, and the ProSe protocol. Between the physical layer of a UE (A) and the physical layer of a UE (B), a discovery signal is transmitted via a physical channel called a physical sidelink discovery channel (PSDCH). Between the MAC layer of the UE (A) and the MAC layer of the UE (B), a discovery signal is transmitted via a transport channel called a sidelink discovery channel (SL-DCH).

The direct communication is a mode in which data is directly transmitted between the UEs by specifying a specific destination (destination group). The direct communication is communication between two or more UEs capable of executing the proximity-based services through user plane transmission in which the E-UTRA technology is used via a path without passing through any network node.

A resource allocation type of the direct communication includes "Mode 1" and "Mode 2". In "Mode 1", the eNB 200 allocates a radio resource of the direct communication. In "Mode 2", the UE 100 selects a radio resource of the direct communication. In Mode 2, the UE 100 may select a radio resource from the resource pools provided by the eNB 200.

A direct communication protocol stack includes a physical (PHY) layer, a MAC layer, an RLC layer, and a PDCP layer. Between the physical layer of the UE (A) and the physical layer of the UE (B), a control signal is transmitted via a physical sidelink control channel (PSCCH), and data is transmitted via a physical sidelink shared channel (PSSCH). A synchronization signal and the like may be transmitted via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

(Radio Terminal)

Figure 4:
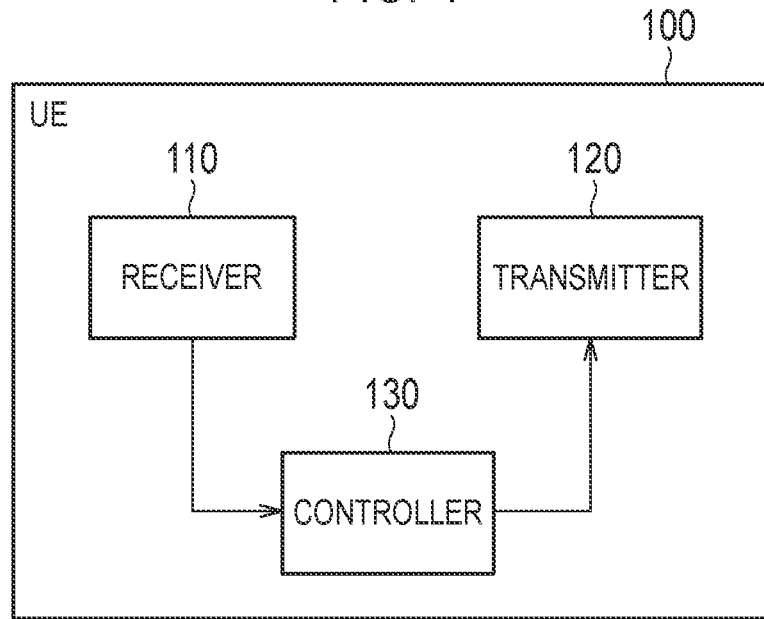
FIG. 4 is a block diagram of a UE 100.

The UE 100 (radio terminal) according to the embodiment will be described. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 120 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, and coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100. The UE 100 may have other receiver units to obtain location information.

For simplicity, a process executed by at least any one of the receiver 110, the transmitter 120, and the controller 130 included in the UE 100 is described herein as a process (operation) executed by the UE 100.

(Base Station)

Figure 5:
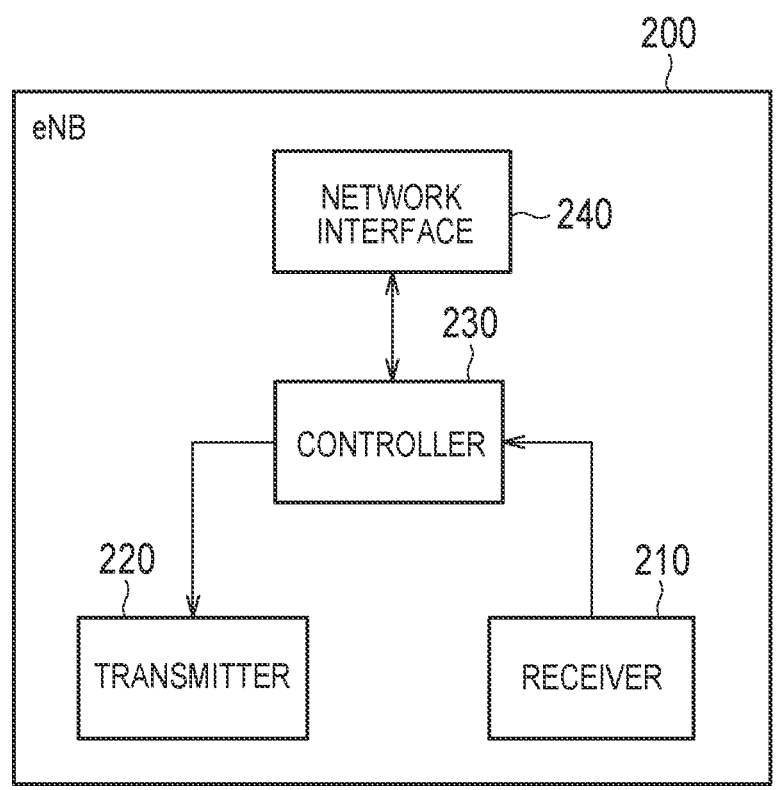
FIG. 5 is a block diagram of an eNB 200.

The eNB 200 (base station) according to the embodiment will be described. FIG. 5 is a block diagram of the eNB 200. As illustrated in FIG. 5, the eNB 200 includes a receiver 210, a transmitter 220, a controller 230, and a network interface 240. The receiver 210 and the transmitter 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs, for example, modulation and demodulation, coding and decoding, and the like, of the baseband signal. The CPU executes a program stored in the memory to perform various types of processes. The processor executes various types of processes described later, and various types of communication protocols described above.

The network interface 240 is connected to a neighbour eNB 200 via the X2 interface. The network interface 240 is connected to the MME 300 and the SGW 400 via the S1 interface. The network interface 240 is used in communication performed on the X2 interface and communication performed on the S1 interface, for example. The network interface 240 is used for communication with the HSS 500.

For simplicity, a process executed by at least any one of the transmitter 210, the receiver 220, the controller 230, and the network interface 240 included in the eNB 200 is described herein as a process (operation) executed by the eNB 200.

First Embodiment (Operation According to First Embodiment)

Figure 6:
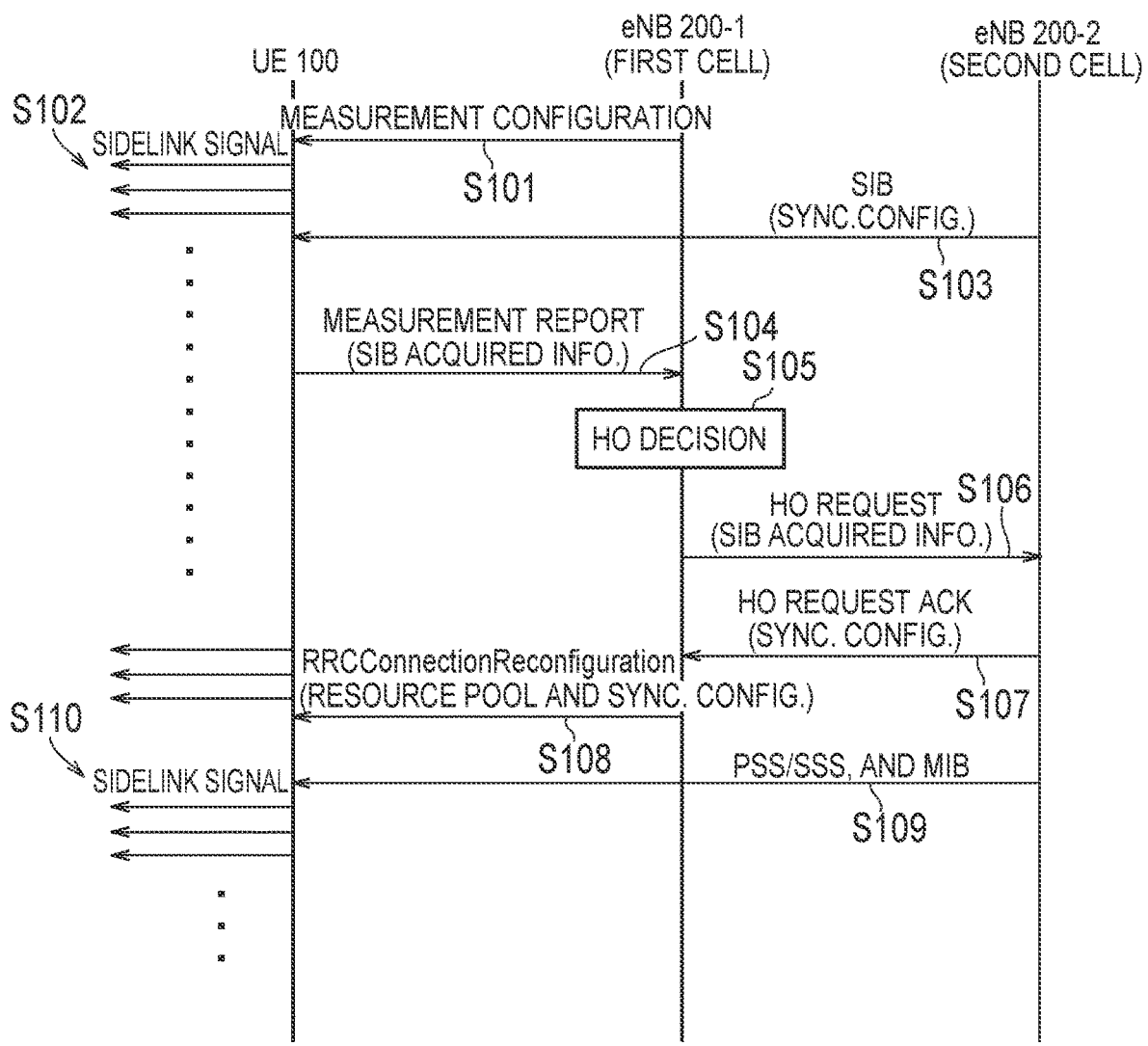
FIG. 6 is a sequence chart for describing an operation according to a first embodiment.

Next, the operation according to the first embodiment will be described with reference to FIG. 6. FIG. 6 is a sequence chart for describing an operation according to a first embodiment.

In FIG. 6, the UE 100 is located in a cell (first cell/source cell) managed by an eNB 200-1. The UE 100 is in the RRC connected state with the eNB 200-1 (first cell). The source cell is the primary cell of the UE 100. The source cell and a cell (second cell/target cell) managed by an eNB 200-2 are adjacent to each other.

In step S101, the eNB 200-1 (first cell) transmits measurement setting information (Measurement configuration) to the UE 100. The UE 100 receives the measurement setting information from the eNB 200-1.

The measurement setting information is information on setting for the UE 100 to transmit a measurement report. The UE 100 executes measurement of a radio environment of the UE 100 based on the measurement setting information. The UE 100 reports a measurement result to the eNB 200-1 based on the measurement setting information.

The measurement setting information may include information indicating whether or not to permit the measurement report to include predetermined information (SIB acquired info.) for informing the eNB 200-1 whether or not the UE 100 has acquired synchronization setting information. The information may be information indicating permission to include the predetermined information in the measurement report. The information may be information indicating no permission to include the predetermined information in the measurement report.

In step S102, the UE 100 executes the proximity-based service. Specifically, the UE 100 transmits a radio signal (sidelink signal) in the proximity-based service. The proximity-based service executed by the UE 100 may be sidelink discovery (direct discovery). The proximity-based service executed by the UE 100 may be sidelink communication (direct communication).

The UE 100 can transmit a sidelink signal (discovery message/user data) by using a radio resource (transmission resource pool) provided from the eNB 200-1. For example, the UE 100 may transmit the sidelink signal by using the radio resource allocated by the eNB 200-1. The UE 100 may select a radio resource from the resource pools provided by the eNB 200-1. The UE 100 may transmit the sidelink signal by using the selected resource pool. The UE 100 can transmit the sidelink signal periodically or aperiodically.

When transmitting the sidelink signal, the UE 100 needs to transmit a synchronization signal (sidelink synchronization signal: SLSS (Sidelink Synchronization Signal)) in the proximity-based service, based on the synchronization setting information provided by the eNB 200-1 (first cell). This is because other UEs 100 synchronize with the UE 100 to receive the sidelink signal from the UE 100.

The synchronization setting information (Sync.Config. (SL-SyncConfig)) is information for defining setting information related to the transmission of the synchronization signal for the sidelink communication and the sidelink discovery. The synchronization setting information may be information for defining setting information related to reception of the synchronization signal from a neighbour cell.

The synchronization setting information may be "discSyncConfig" included in SIB 19 (System Information Block 19). Here, "discSyncConfig" indicates settings used when the UE 100 transmits (and receives) the SLSS (synchronization information) for sidelink discovery. The synchronization setting information may be "commSyncConfig" included in SIB 18 (System Information Block 18). Here, "commSyncConfig" indicates settings used when the UE 100 transmits (and receives) the SLSS (synchronization information) for sidelink communication.

The synchronization setting information may include information (timing information) related to a transmission timing of the SLSS. The timing information may include "syncCP-Len (SL-CP-Len)". Here, "syncCP-Len" indicates the cyclic prefix length. The timing information may include "syncOffsetIndicator (SL-OffsetIndicatorSync)". Here, "syncOffsetIndicator" is information indicating the time position of a synchronization resource. The synchronization resource is in a system frame number (SFN) and a subframe which satisfy "(SFN*10+Subframe Number) mod 40=SL-OffsetIndicatorSync".

The synchronization setting information may include an identifier (SLSSID) for identifying the cell. The SLSSID is used for a transmission UE so that the synchronization signal is spread beyond the coverage area of the cell. The SLSSID is used for a reception UE to detect a non-synchronized neighbour cell. When transmitting the SLSS, the UE 100 selects the SLSSID. Information (such as a transmission resource pool, and timing information) corresponding to the selected SLSSID is used.

The synchronization setting information includes transmission parameters (txPrameters) used for transmitting the SLSS. The transmission parameters include parameters related only to the transmission of the SLSS.

The transmission parameters may include transmission power control information used for transmitting the SLSS. Specifically, the power control information is a set of parameters (α, p0) set to calculate a transmission power of the SLSS.

The transmission parameters may include determination information for determining whether or not to start transmission of the SLSS. Specifically, the determination information is a threshold value (syncTxThresh IC) used while the UE 100 is located within the coverage. The threshold value defines a level to be compared with a reception power (RSRP: Reference Signal Received Power) of the radio signal from the eNB 200-1 (first cell). When the measured RSRP falls below the threshold value (level), the UE 100 can transmit the SLSS.

The synchronization setting information may include at least one of the timing information and the transmission parameters. The synchronization setting information may include both the timing information and the transmission parameters.

The UE 100 can select the synchronization setting information based on a synchronization setting index (syncConfigIndex) included in information of the resource pool. The synchronization setting index indicates the synchronization setting information associated with a transmission resource pool or a reception resource pool.

In step S103, the eNB 200-2 (second cell) transmits synchronization setting information. The synchronization setting information is information for transmitting the SLSS in the second cell. The eNB 200-2 can transmit the synchronization setting information by an SIB (System Information Block).

If the UE 100 is located within the coverage of the second cell, the UE 100 can receive the SIB from the second cell. The UE 100 can acquire the synchronization setting information (Sync.Config.) by reading the SIB.

Only when transmitting the sidelink signal, the UE 100 may attempt to receive the SIB from the neighbour cell. If the UE 100 executes reception of the sidelink signal or does not execute the proximity-based service, the UE 100 may not attempt to receive the SIB from the neighbour cell. Only when the UE 100 permitted to include the predetermined information in the measurement report, the UE 100 may attempt to receive the SIB from the neighbour cell. If the measurement report is not permitted to include the predetermined information, the UE 100 may not attempt to receive the SIB from the neighbour cell.

The UE 100 may only attempt to receive the SIB from the neighbour cell having the highest reception strength of radio signal among a plurality of neighbour cells.

In step S104, the UE 100 transmits the measurement report to the eNB 200-1. The eNB 200-1 receives the measurement report.

The measurement report includes the measurement result of the radio environment of the UE 100. The measurement result may include, for example, the reception strength (RSRP) of the radio signal from the first cell and/or the neighbour cell (second cell). The measurement result may include a reception quality (RSRQ: Reference Signal Received Quality) of the radio signal from the first cell and/or the neighbour cell (second cell).

The measurement report may include predetermined information (SIB acquired info.). The predetermined information is information for informing the eNB 200-1 of whether or not the UE 100 has acquired the synchronization setting information in the neighbour cell. The predetermined information may be information indicating that the UE 100 has acquired the synchronization setting information. The predetermined information may be information indicating that the UE 100 has not acquired the synchronization setting information.

The predetermined information may be information indicating whether or not the SIB (SIB 18 and/or SIB 19) including the synchronization setting information has been received (acquired).

The predetermined information may include an identifier indicating a cell that is a transmission source of the synchronization setting information. The predetermined information may include an identifier indicating a frequency of the cell that is the transmission source of the synchronization setting information.

The predetermined information may include information indicating an acquisition time of the synchronization setting information (SIB). The predetermined information may include a value tag (systemInfoValueTag) included in the acquired SIB.

In this way, the UE 100 can transmit the predetermined information to the eNB 200-1 based on the measurement report. The UE 100 may include the predetermined information in the measurement report if the eNB 200-1 permits that. If the eNB 200-1 does not permit that, the UE 100 may omit including the predetermined information in the measurement report.

The eNB 200-1 receives the measurement report from the UE 100. Accordingly, the eNB 200-1 can receive the predetermined information.

In step S105, the eNB 200-1 decides whether or not to execute a handover based on the measurement report. When the handover can be executed to a plurality of cells and the UE 100 has acquired the synchronization setting information, the eNB 200-1 may give priority to the handover to the cell that is the transmission source of the synchronization setting information.

The following description is made assuming that the eNB 200-1 has decided that a handover to the second cell is to be executed.

In step S106, the eNB 200-1 transmits a handover request (HO Request) message to the eNB 200-2.

The handover request message is a message for requesting preparation of a resource for the handover. The handover request message may include the predetermined information. That is, the eNB 200-1 may transfer the predetermined information to the eNB 200-2.

The eNB 200-2 receives the handover request message. The eNB 200-2 decides whether or not to approve the handover request. The following description is made assuming that the eNB 200-2 has decided to approve the handover request.

In step S107, the eNB 200-2 transmits a handover request acknowledgment (HO request ACK) message to the eNB 200-1. The eNB 200-1 receives the HO request ACK message from the eNB 200-2.

The HO request ACK message may include the synchronization setting information in the second cell that is the handover target of the UE 100. The HO Request ACK message may include information of a transmission resource pool used for the proximity-based service in the second cell.

The eNB 200-2 may determine whether or not to include the synchronization setting information in the HO request ACK message, based on the predetermined information. Only when the UE 100 has not acquired the synchronization setting information, the eNB 200-2 may include the synchronization setting information in the HO request ACK message. When the UE 100 has acquired the synchronization setting information, the eNB 200-2 does not have to include the synchronization setting information in the HO request ACK message.

Based on the acquisition time of the synchronization setting information (SIB) included in the predetermined information and/or the value tag included in the SIB included in the predetermined information, the eNB 200-2 may determine whether to include the synchronization setting information in the HO request ACK message. When the synchronization setting information acquired by the UE 100 is not the latest synchronization setting information, the eNB 200-2 may include the synchronization setting information in the HO request ACK message.

In step S108, the eNB 200-1 transmits a message (RRC-ConnectionReconfiguration) for starting a handover from the first cell (eNB 200-1) to the second cell (eNB 200-2) to the UE 100.

The message can include information of the transmission resource pool used for the proximity-based service in the second cell, and the synchronization setting information.

The information of the transmission resource pool is information of a transmission resource pool used for transmitting the sidelink signal being executed by the UE 100. The information of the transmission resource pool is, for example, "SL-CommResourcePool (SL-CommTxPool-List)" that specifies setting information for individual pools of resources for the sidelink communication. The information of the transmission resource pool may be, for example, "SL-DiscResourcePool (SL-DiscTxPoolList)" that specifies setting information for individual pools of resources for the sidelink discovery.

The information of the transmission resource pool may be a transmission resource pool that is available until the UE 100 receives the transmission resource pool (or radio resource) from the second cell after the UE 100 executes a handover. When receiving the transmission resource pool (or radio resource) from the second cell, the UE 100 may start transmission of the sidelink signal by using the newly received transmission resource pool.

The UE 100 receives, from the eNB 200-1, a message for starting a handover from the first cell to the second cell. In response to receiving the message, the UE 100 starts the handover. In response to receiving the message, the UE 100 suspends the transmission of the sidelink signal.

In step S109, the eNB 200-2 transmits a synchronization signal. The UE 100 receives the synchronization signal from the second cell. The UE 100 establishes synchronization with the second cell based on the synchronization signal. When executing the proximity-based service, the UE 100 located in the cell has to establish synchronization with the cell. When the UE 100 is located in the cell, the UE 100 is in a state where the UE 100 camps in the cell or is connected with the cell.

The synchronization signal includes a PSS (Primary Synchronization Signal)/SSS (Secondary Synchronization Signal), and an MIB (Master Information Block). The synchronization signal is used to establish the synchronization with the second cell (eNB 200-2). The synchronization signal is a signal periodically transmitted from the eNB 200-2.

In step S110, after establishing the synchronization with the second cell, the UE 100 starts transmitting the sidelink signal (discovery message/user data) by using the transmission resource pool. Specifically, the UE 100 selects a radio resource used for the transmission of the sidelink signal from the transmission resource pool. The UE 100 starts transmitting a sidelink synchronization signal based on the synchronization setting information.

After the handover is completed, the UE 100 can start transmitting the sidelink signal before acquiring the SIB from the second cell. After establishing the synchronization with the second cell and before the handover is completed (before transmitting an RRC connection reconfiguration completion message to the eNB 200-2), the UE 100 may start transmitting the sidelink signal (and the sidelink synchronization signal). After the handover is completed, the UE 100 may start transmitting the sidelink signal (and the sidelink synchronization signal).

As described above, the UE 100 can start transmitting the sidelink signal earlier than in the case where the UE 100 acquires the SIB from the second cell after the handover is completed. Thus, it is possible to shorten the period during which the transmission of the sidelink signal by the handover is suspended.

Even if the UE 100 has the synchronization setting index included in the information of the transmission resource pool before the handover, the UE 100 cannot transmit the sidelink synchronization signal when the UE 100 has not received the synchronization setting information indicated by the synchronization setting index. Therefore, the synchronization setting information being included in the message for starting the handover makes it possible to shorten the period during which the transmission of the sidelink signal is suspended in the UE 100.

(First Modification)

Figure 7:
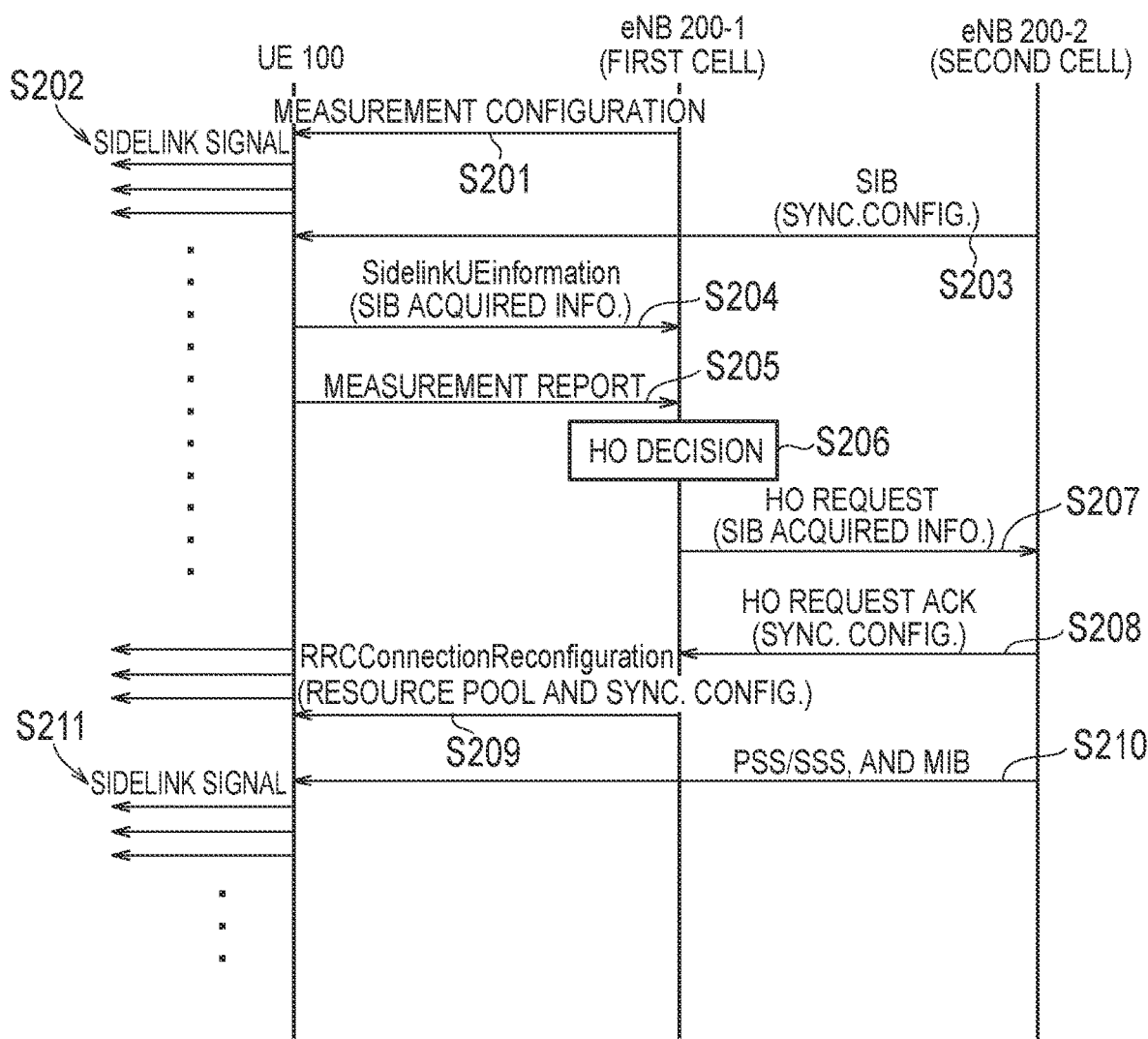
FIG. 7 is a sequence chart for describing an operation according to a first modification of the first embodiment.

An operation according to a first modification of the first embodiment will be described with reference to FIG. 7. FIG. 7 is a sequence chart for describing the operation according to the first modification of the first embodiment. The description of the contents explained above is omitted as appropriate.

In this modification, a case where the UE 100 transmits the predetermined information to the eNB 200-1 by a message other than the measurement report will be described.

Steps S201 to S203 correspond to steps S101 to S103.

In step S204, the UE 100 transmits the predetermined information to the eNB 200-1 by using sidelink UE information message.

The sidelink UE information is a message used to provide the sidelink information to the eNB 200-1.

In response to receiving the synchronization setting information, the UE 100 may transmit the predetermined information to the eNB 200-1 by using the sidelink UE information message. When a trigger condition for transmitting the sidelink UE information message is satisfied, the UE 100 may transmit the predetermined information to the eNB 200-1 by using the sidelink UE information message. For example, when requesting a transmission resource for transmitting the sidelink signal, the UE 100 may transmit, to the eNB 200-1, the sidelink UE information message including information for requesting the resource and the predetermined information.

Steps S205 to S211 correspond to steps S104 to S110.

In step S205, the UE 100 may not transmit the predetermined information to the eNB 200-1 by using the measurement report. The UE 100 may transmit the predetermined information to the eNB 200-1 by using the measurement report. Only when the synchronization setting information transmitted by using the sidelink UE information message is different from the synchronization setting information finally acquired, the UE 100 may transmit the predetermined information by using the measurement report.

In step S207, the eNB 200-1 can transfer the information (AS-Config) including the sidelink UE information message (the predetermined information) to the eNB 200-2.

(Second Modification)

Figure 8:
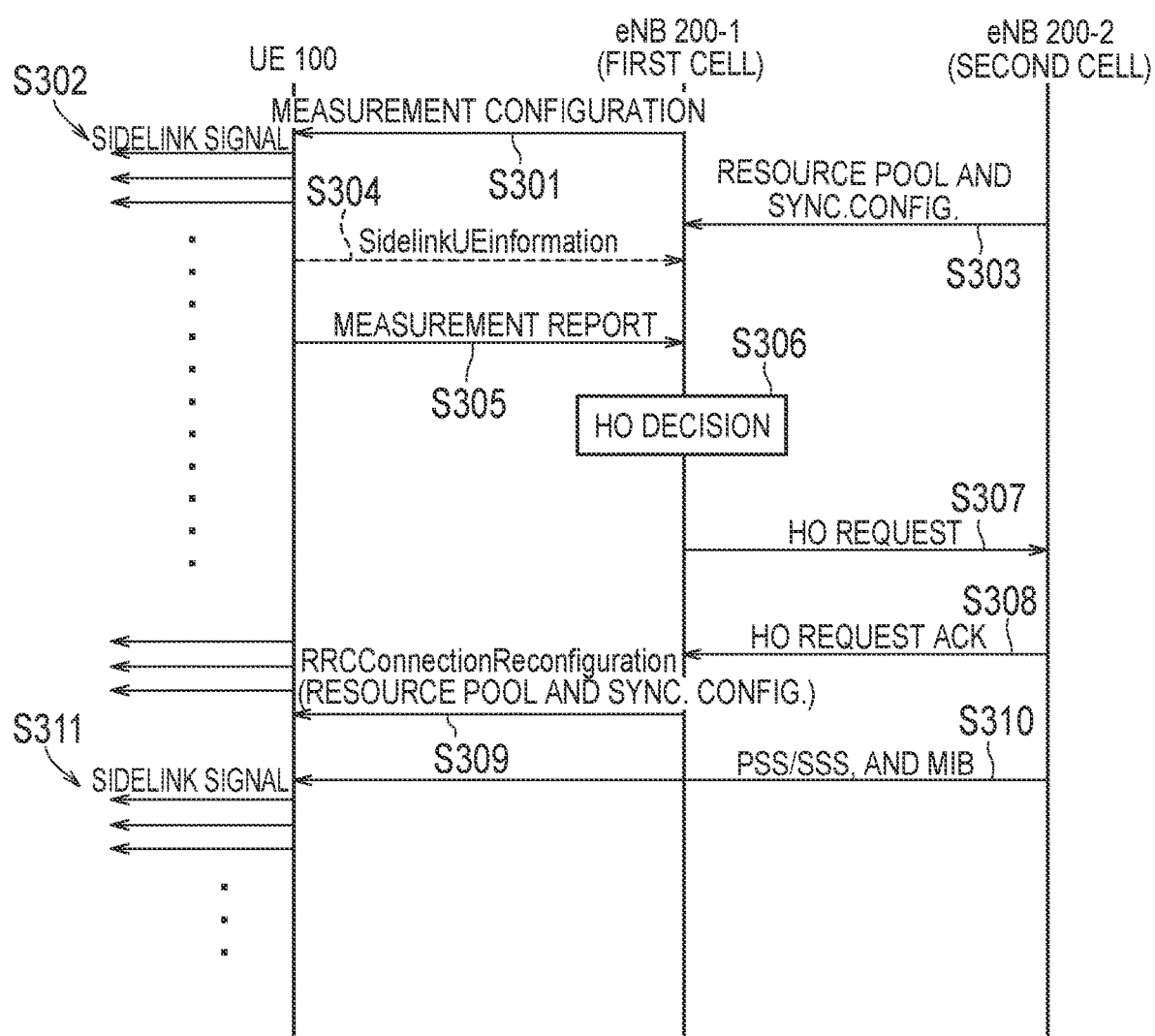
FIG. 8 is a sequence chart for describing an operation according to a second modification and a third modification of the first embodiment.

An operation according to a second modification of the first embodiment will be described with reference to FIG. 8. FIG. 8 is a sequence chart for describing the operation according to the second modification (and a third modification) of the first embodiment. The description of the contents explained above is omitted as appropriate.

In this modification, the eNB 200-1 determines whether or not to include the synchronization setting information in the message.

Steps S301 and S302 correspond to steps S101 and S102.

In step S303, the eNB 200-2 transmits the synchronization setting information to the eNB 200-2. The eNB 200-1 receives the synchronization setting information from the eNB 200-2.

The eNB 200-2 may transmit the information of the transmission resource pool together with the synchronization setting information.

The eNB 200-2 may transmit the synchronization setting information to the eNB 200-1 in response to updating the synchronization setting information. When changing the synchronization setting information to be transmitted by broadcast into its own cell by using the SIB, the eNB 200-2 may transmit the synchronization setting information to the eNB 200-1.

Step S304 corresponds to step S204. Step S304 may be omitted. Steps S305 to S308 correspond to steps S104 to S107.

In step S309, the eNB 200-1 includes, in a message for starting the handover, the information of the transmission resource pool and the synchronization setting information. The eNB 200-1 transmits the message to the UE 100.

When the radio resource (or transmission resource pool) used for the proximity-based service is allocated to the UE 100, the eNB 200-1 may include, in the message, the information of the transmission resource pool and the synchronization setting information.

When it is preferable to shorten the period during which the transmission of the sidelink signal is suspended, the eNB 200-1 may include, in the message, the information of the transmission resource pool and the synchronization setting information. For example, the eNB 200-1 may determine whether or not to include, in the message, the information of the transmission resource pool and the synchronization setting information, depending on the type of radio resource or transmission resource pool (hereinafter referred to as ProSe resource) used for the proximity-based service. For example, when the ProSe resource used by the UE 100 is for inter-vehicle communication (V2V: Vehicle-to-Vehicle), the eNB 200-1 may include, in the message, the information of the transmission resource pool and the synchronization setting information. When the ProSe resource used by the UE 100 is for unicast (or groupcast), the eNB 200-1 may include, in the message, the information of the transmission resource pool and the synchronization setting information.

When the ProSe resource used by the UE 100 is for commercial use, the eNB 200-1 does not have to include, in the message, the information of the transmission resource pool and the synchronization setting information. When the ProSe resource used by the UE 100 is for broadcast, the eNB 200-1 does not have to include, in the message, the information of the transmission resource pool and the synchronization setting information.

The eNB 200-1 may determine whether or not to include, in the message, the information of the transmission resource pool and the synchronization setting information, depending on the type of the ProSe resource requested by using the sidelink UE information message by the UE 100.

The eNB 200-1 may determine whether or not to include, in the message, the information of the transmission resource pool and the synchronization setting information, based on the predetermined information received from the UE 100. For example, if the predetermined information indicates that the UE 100 has not acquired the synchronization setting information, the eNB 200-1 may include, in the message, the information of the transmission resource pool and the synchronization setting information. If the predetermined information indicates that the UE 100 has acquired the synchronization setting information, the eNB 200-1 does not have to include, in the message, the information of the transmission resource pool and the synchronization setting information. In this way, the eNB 200-1 may determine whether or not to include, in the message, the synchronization setting information and the transmission resource pool information which are acquired in advance from the eNB 200-2.

Steps S309 and S310 correspond to steps S108 and S109.

(Third Modification)

Next, an operation according to the third modification of the first embodiment will be described with reference to FIG. 8. The description of the contents explained above is omitted as appropriate.

In step S304, the UE 100 may include, in the sidelink UE information message, information (hereinafter referred to as UE information) related to the situation of the UE 100 executing the proximity-based service. The eNB 200-1 receives the UE information by receiving the sidelink UE information message.

The UE information may include information (speed information) indicating the speed of the UE 100.

The UE information may include information indicating whether or not an application for which the period during which the use of the proximity-based service by the handover is suspended is to be shorten is being executed. For example, the UE information may include information (V2V information) indicating whether or not the UE 100 is executing inter-vehicle communication (V2V) using the D2D proximity-based service.

The UE information may include information (priority information) indicating the priority of the proximity-based service. The priority information may be information indicating the priority (PPPP: ProSe Per-Packet Priority) of a packet to be transmitted (received) by the proximity-based service. The priority information may be information indicating the priority of an application using the proximity-based service.

In step S309, the eNB 200-1 can determine whether or not to include, in the message, the information of the transmission resource pool and the synchronization setting information according to the UE information.

When the eNB 200-1 determines that the speed of the UE 100 exceeds a threshold value based on the speed information, the eNB 200-1 may include, in the message, the information of the transmission resource pool and the synchronization setting information. On the other hand, when the eNB 200-1 determines that the speed of the UE 100 does not exceed the threshold value based on the speed information, the eNB 200-1 does not have to include, in the message, the information of the transmission resource pool and the synchronization setting information.

When the eNB 200-1 determines that the UE 100 is executing the V2V based on the V2V information, the eNB 200-1 may include, in the message, the information of the transmission resource pool and the synchronization setting information. On the other hand, when the UE 100 is not executing the V2V based on the V2V information, the eNB 200-1 does not have to include, in the message, the information of the transmission resource pool and the synchronization setting information.

When the eNB 200-1 determines that the priority of the proximity-based service (for example, PPPP) is higher than a threshold value based on the priority information, the eNB 200-1 may include, in the message, the information of the transmission resource pool and the synchronization setting information. On the other hand, when the eNB 200-1 determines that the priority of the proximity-based service is lower than the threshold value based on the priority information, the eNB 200-1 does not have to include, in the message, the information of the transmission resource pool and the synchronization setting information.

As described above, only when it is necessary to shorten the period during which the transmission of the sidelink signal is suspended, the eNB 200-1 can include, in the message, the information of the transmission resource pool and the synchronization setting information.

(Fourth Modification)

Figure 9:
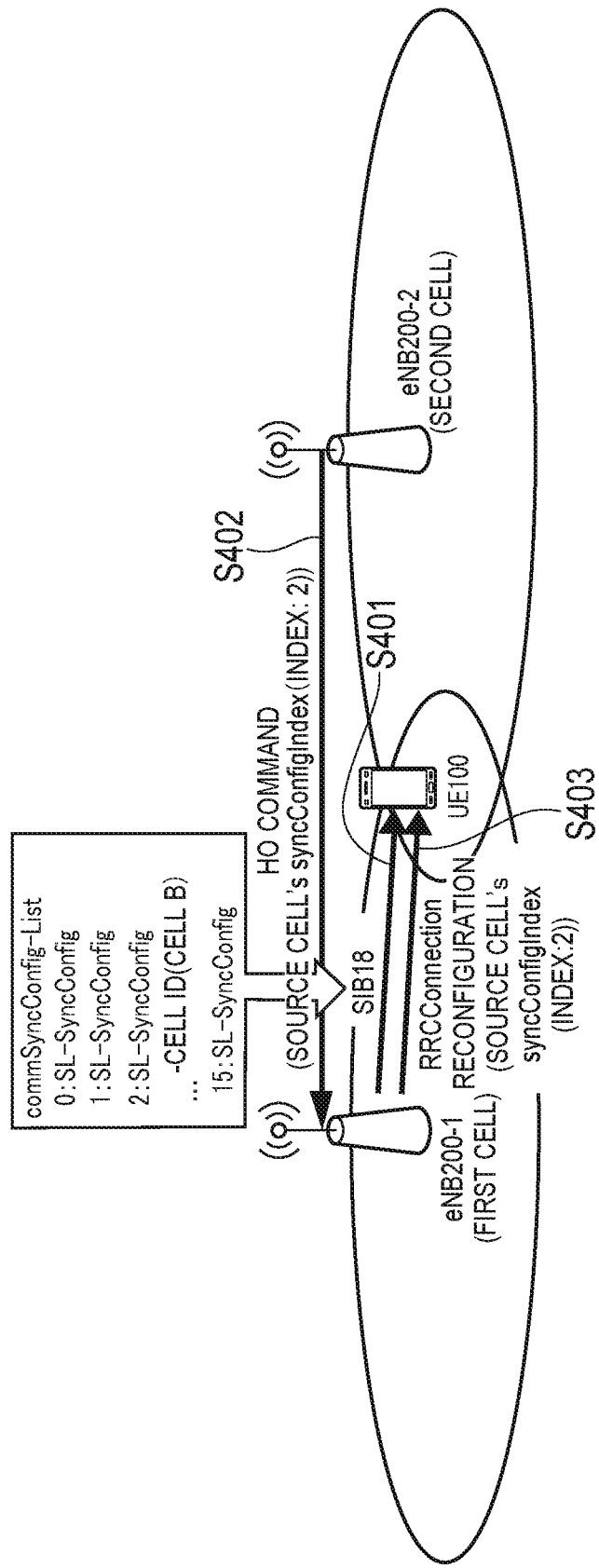
FIG. 9 is an explanatory diagram for describing an operation according to a fourth modification of the first embodiment.

An operation according to a fourth modification of the first embodiment will be described with reference to FIG. 9. FIG. 9 is an explanatory diagram for describing the operation according to the fourth modification of the first embodiment. The description of the contents explained above is omitted as appropriate.

In this modification, the message for starting the handover includes a synchronization setting index (syncConfigIndex), not the synchronization setting information (SL-SyncConfig).

In step S401 of FIG. 9, the eNB 200-1 provides (transmits) a list of the synchronization setting information (commSyncConfigList (or discSyncConfigList)) to the UE 100. For example, the eNB 200-1 can transmit the list to the UE 100 by an SIB (for example, SIB 18 (or SIB 19)).

Each of the plurality of pieces of synchronization setting information included in the list is associated with a first index (for example, 0 to 15). The first index specifies the synchronization setting information (i.e., the first index indicates the synchronization setting information). A part of the plurality of pieces of synchronization setting information is synchronization setting information in a neighbour cell (second cell). The synchronization setting information may be associated with an identifier (Cell ID) of the neighbour cell (second cell: Cell B). The synchronization setting information may be available in the first cell.

The eNB 200-1 shares the list with the eNB 200-2. For example, the eNB 200-1 transmits the list to the eNB 200-2 before step S402. The eNB 200-1 may transmit the list to the eNB 200-2 via the X2 interface. The eNB 200-1 may transmit the list to the eNB 200-2 in response to updating (creating) the list.

Alternatively, the eNB 200-2 may receive the list from an OAM (Operations And Management). The OAM is a server device managed by an operator. The OAM can perform maintenance and monitoring of the E-UTRAN 10. The OAM is provided in the EPC 20.

When deciding the handover of the UE 100, the eNB 200-1 transmits a handover request message to the eNB 200-2 in the same manner as described above. The handover request message may include the predetermined information.

In step S402, the eNB 200-2 transmits a handover command (HO command) to the eNB 200-1. The handover command may be an HO request ACK message.

The eNB 200-2 selects synchronization setting information to be set for the UE 100 that is the handover target, from the list provided by the eNB 200-1 to the UE 100 (i.e., the list shared with the eNB 200-1). Specifically, the eNB 200-2 selects synchronization setting information available in the second cell from the list. The selected synchronization setting information is synchronization setting information for the UE 100 to transmit a synchronization signal in the second cell.

The eNB 200-2 includes, in the handover command, a synchronization setting index (for example, index: 2) corresponding to the selected synchronization setting information. The index corresponds to an index included in the list provided by the first cell. That is, the index is the synchronization setting index of the first cell (source cell).

In step S403, the eNB 200-1 transmits a message (RRCConnectionReconfiguration) including the synchronization setting index received from the eNB 200-2 to the UE 100. The UE 100 receives the message.

Since the synchronization setting index included in the message corresponds to a predetermined synchronization setting information included in the list provided by the first cell, the UE 100 can grasp the predetermined synchronization setting information available in the second cell. As a result, the UE 100 can start transmitting the sidelink synchronization signal based on the predetermined synchronization setting information before acquiring the SIB (synchronization setting information) from the second cell. Therefore, it is possible to shorten the period during which the transmission of the sidelink signal by the handover is suspended.

(Fifth Modification)

Figure 10:
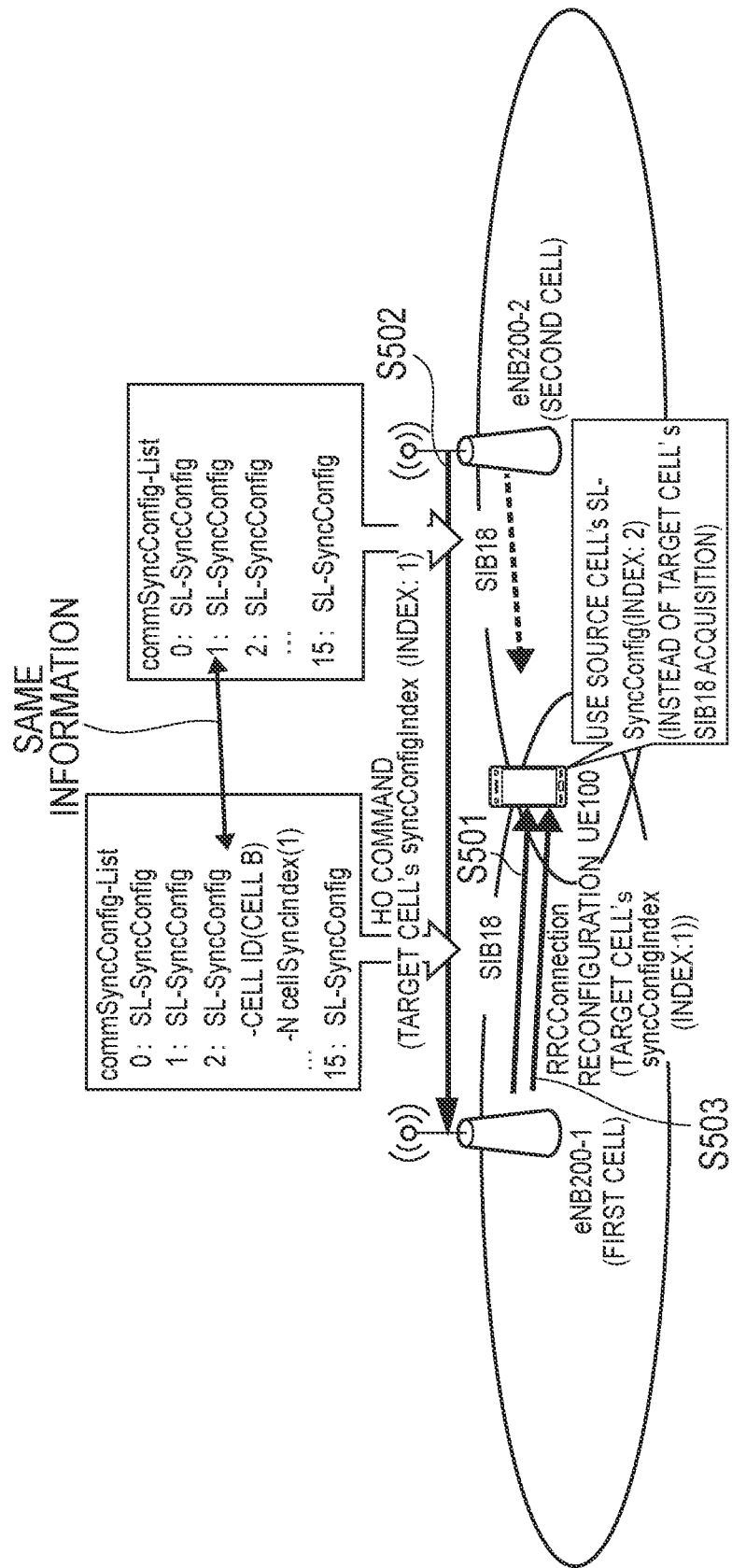
FIG. 10 is a diagram for describing an operation according to a fifth modification of the first embodiment.

An operation according to a fifth modification of the first embodiment will be described with reference to FIG. 10. FIG. 10 is an explanatory diagram for describing the operation according to the fifth modification of the first embodiment. The description of the contents explained above is omitted as appropriate.

In this modification, the message for starting the handover includes the synchronization setting index of the second cell (target cell), not the synchronization setting index of the first cell (source cell).

As illustrated in FIG. 10, the eNB 200-2 provides the list of synchronization setting information (hereinafter referred to as a second list) into the second cell. The second list includes a second index (0 to 15). Each of the plurality of pieces of synchronization setting information included in the second list is associated with the second index. The second index corresponds to the synchronization setting information (the second index indicates the synchronization setting information).

Step S501 in FIG. 10 corresponds to step S401. The eNB 200-1 provides (transmits) the list of synchronization setting information (first list) to the UE 100. The first list includes the first index (0 to 15). Each of the plurality of pieces of synchronization setting information included in the first list is associated with the first index (0 to 15).

In this modification, a part of the plurality of pieces of synchronization setting information included in the first list is the same as the synchronization setting information in the neighbour cell (second cell). The synchronization setting information is associated not only with the first index but also with the second index (for example, NcellSyncIndex (1)). The synchronization setting information may be associated with an identifier (Cell ID) of the neighbour cell (second cell: Cell B). Therefore, the eNB 200-1 (first cell) transmits the first list including the second index associated with the synchronization setting information to the UE 100.

The eNB 200-1 shares the second list with the eNB 200-2 as described above. When creating (updating) the first list, the eNB 200-1 can associate the second index with the synchronization setting information that is commonly included in the first list and the second list.

When deciding the handover of the UE 100, the eNB 200-1 transmits a handover request message to the eNB 200-2 in the same manner as described above.

In step S502, the eNB 200-2 transmits a handover command (HO command) to the eNB 200-1.

The eNB 200-2 selects synchronization setting information to be set for the UE 100 that is the handover target, from the second list. The eNB 200-2 includes, in the handover command, a synchronization setting index (for example, index: 1) corresponding to the selected synchronization setting information. The index corresponds to the second index included in the second list. That is, the second index is the synchronization setting index of the second cell (target cell).

In step S503, the eNB 200-1 transmits, to the UE 100, a message (RRCConnectionReconfiguration) including the synchronization setting index (second index) received from the eNB 200-2. The UE 100 receives the message.

Since the synchronization setting index included in the message corresponds to the second index, the UE 100 selects synchronization setting information corresponding to the second index (NcellSyncIndex), not the first index (0 to 15). In FIG. 10, the UE 100 can select synchronization setting information corresponding to the first index indicating "2" out of the plurality of pieces of synchronization setting information included in the first list. As a result, the UE 100 can start transmitting the sidelink synchronization signal based on the predetermined synchronization setting information without acquiring the SIB (synchronization setting information) from the second cell. Therefore, it is possible to shorten the period during which the transmission of the sidelink signal by the handover is suspended.

Second Embodiment

Figure 11:
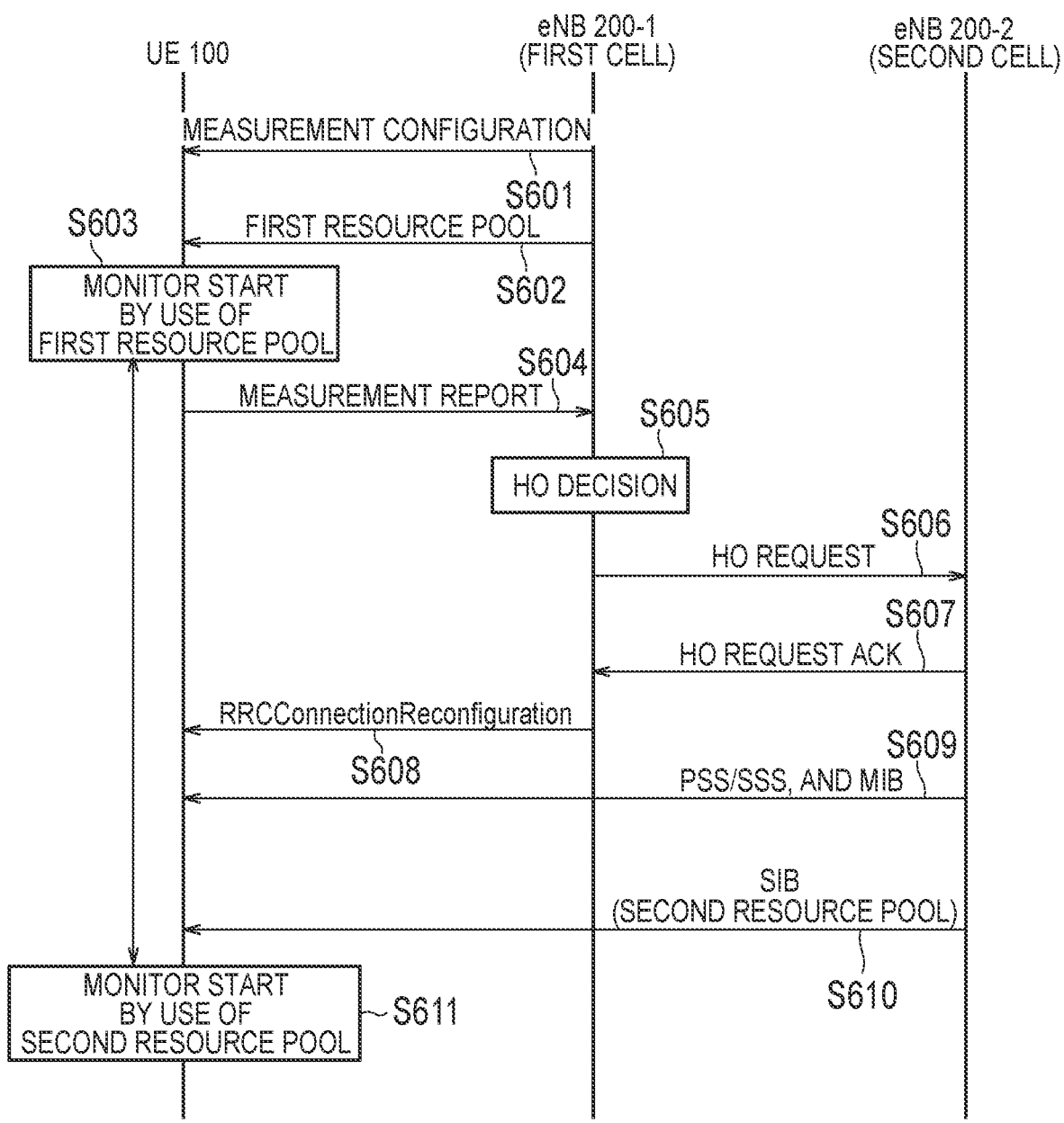
FIG. 11 is a sequence chart for describing an operation according to a second embodiment.

An operation according to a second embodiment will be described with reference to FIG. 11. FIG. 11 is a sequence chart for describing the operation according to the second embodiment. The description of the contents explained above is omitted as appropriate.

In the second embodiment, a case where the UE 100 is executing the reception operation in the proximity-based service will be described.

In FIG. 11, step S601 corresponds to step S101.

In step S602, the eNB 200-1 transmits information of a reception resource pool (first resource pool) used for the proximity-based service in the first cell. The UE 100 receives the information of the first resource pool from the eNB 200-1. The information of the first resource pool may be "commRxPool" indicating a resource through which the UE 100 in the RRC idle state or the RRC connected state is permitted to receive a sidelink communication. The information of the first resource pool may be "discRxPool" indicating a resource through which the UE 100 the RRC idle state or the RRC connected state is permitted to receive a discovery announcement.

In step S603, the UE 100 starts monitoring for receiving a sidelink signal in the proximity-based service based on the information of the first resource pool.

Steps S604 to S609 correspond to steps S104 to S109. It is noted that the message in steps S604 to S609 does not have to include the predetermined information. The message does not have to include the synchronization setting information. The message does not have to include the information of the reception resource pool.

In steps S604 to S609, the UE 100 can continue the monitoring of the sidelink signal. That is, even when the UE 100 receives the message for starting the handover from the first cell to the second cell, the UE 100 continues the monitoring of the sidelink signal by using the first resource pool.

Only if the UE 100 has two receivers (Rx Chains), the UE 100 can continue the monitoring of the sidelink signal by using the first resource pool. The UE 100 may prioritize the operations in steps S608 and S609 over the monitoring of the sidelink signal. This allows the UE 100 to continue the monitoring of the sidelink signal even if the UE 100 has only one receiver (Rx Chains).

After receiving the message in step S608, the UE 100 may start the operation for executing the handover earlier than in the case where the monitor is not being performed. For example, immediately after receiving the message, the UE 100 starts transmitting an RACH (Random Access Channel) to the eNB 200-2. This allows the UE 100 to complete the handover before leaving the first cell. Accordingly, even after the handover, the UE 100 can recognize the first cell as an appropriate cell (Suitable Cell). Therefore, the UE 100 can continue the monitoring of the sidelink signal by using the first resource pool.

In step S610, the eNB 200-2 (second cell) transmits information of a reception resource pool (second resource pool) used for the proximity-based service in the second cell. The UE 100 receives the information of the second resource pool from the eNB 200-2.

In step S611, the UE 100 starts monitoring for receiving the sidelink signal in the proximity-based service based on the information of the second resource pool. Therefore, after acquiring (receiving) the information of the second resource pool, the UE 100 can switch from the monitor using the first resource pool to the monitor using the second resource pool.

In this way, even when the UE 100 receives the message for starting the handover, the UE 100 can use the first resource pool until acquiring the second resource pool. Thus, it is possible to shorten the period during which the reception (monitoring) of the sidelink signal is suspended.

(Modification)

A modification according to the second embodiment will be described with reference to FIG. 11. The description of the contents explained above is omitted as appropriate.

In this modification, a case where the UE 100 starts a handover earlier under the control of the eNB 200-1 will be described.

Step S601 corresponds to step S101.

The eNB 200-1 may set the trigger of the measurement report to a value lower than the threshold value in order for the UE 100 to start the handover earlier. The eNB 200-1 can transmit the measurement setting information for the settings to the UE 100.

For example, the eNB 200-1 may set the trigger of the measurement report to a value lower than the threshold value if the UE 100 is interested in receiving the sidelink signal. The eNB 200-1 may determine whether or not the UE 100 is interested in receiving the sidelink signal, by using the sidelink UE information message from the UE 100.

When receiving, from the UE 100, a request to shorten the period (suspension period) in which the reception of the sidelink signal is suspended, the eNB 200-1 may set the trigger of the measurement report to a value lower than the threshold value.

If the shortening of the suspension period is preferable, the eNB 200-1 may set the trigger of the measurement report to a value lower than the threshold value. For example, the eNB 200-1 may set the trigger of the measurement report to a value lower than the threshold based on the UE information (see the third modification of the first embodiment) described above. In response to receiving the UE information including information indicating that an application for which the period during which the use of the proximity-based service by the handover is suspended is to be shorten is being executed, the eNB 200-1 may set the trigger of the measurement report to a value lower than the threshold value.

In step S605, the eNB 200-1 may use a specific threshold as the threshold used for the handover decision. The specific threshold value is a value at which the handover is more easily executed than a normal threshold value. For example, when receiving the same measurement result from two UEs 100, the eNB 200-1 may determine that a handover with respect to one of the UEs 100 that is monitoring the sidelink signal is to be executed. The eNB 200-1 may determine that the handover with respect to the other UE 100 that is not executing the proximity-based service is not to be executed. This allows the UE 100 to complete the handover before leaving the first cell. Therefore, even after the handover, the UE 100 can recognize the first cell as an appropriate cell.

As described above, it is possible to shorten the period during which the reception (monitoring) of the sidelink signal is suspended.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In the above description, the operations described above may be executed even in a case where one base station manages two cells.

In the above description, the UE 100 transmits the predetermined information by using the measurement report or the sidelink UE information message, but it is not limited thereto. The UE 100 may transmit the predetermined information to the eNB 200-1 by using another message. For example, the UE 100 may transmit the predetermined information to the eNB 200-1 by using an UE assistance information message. The UE 100 may transmit the UE information to the eNB 200-1 by using the UE assistance information message.

In the above description (the second and third modifications of the first embodiment), the case where the eNB 200-1 performs the determination has been described. However, the eNB 200-2 may determine whether or not to include, in the HO request ACK message, the synchronization setting information and the information of the transmission resource pool. The eNB 200-1 may include, in the handover request message, information (for example, the UE information) necessary for the determination. As with the eNB 200-1, the eNB 200-2 can determine whether or not to include, in the HO request ACK message, the synchronization setting information and the information of the transmission resource pool.

In the above description (the fifth modification of the first embodiment), the eNB 200-1 may rewrite the second index received from the eNB 200-2 into the first index. The eNB 200-1 may transmit a message including the rewritten first index to the UE 100. The synchronization setting information corresponding to the second index (index: 1) corresponds to the first index (index: 2) rewritten in the first list.

As a result, even when the eNB 200-1 transmits the first list not including the second index to the UE 100, the UE 100 can grasp the synchronization setting information before acquiring the SIB (synchronization setting information) from the second cell. Therefore, it is possible to shorten the period during which the transmission of the sidelink signal by the handover is suspended.

In the above description, the first embodiment is directed to the transmission of the sidelink signal, but it is not limited thereto. The operation of the first embodiment may be executed to receive the sidelink signal. For example, the message for starting the handover may include the information of the reception resource pool and the synchronization setting information. The UE 100 starts receiving the sidelink synchronization signal based on the synchronization setting information. The UE 100 starts receiving the sidelink signal (discovery message/user data) by using the reception resource pool. This allows the UE 100 to start receiving the sidelink signal before acquiring the SIB (reception resource pool) from the second cell. In this way, in the first embodiment, it is also possible to replace "transmission" with "reception".

The operation according to each of the above-described embodiments may be combined to be executed, where appropriate. For example, the message for starting the handover may include the information of the transmission resource pool, the information of the reception resource pool, and the synchronization setting information. In each of the above-described sequences, all of the operations may not necessarily be an essential configuration. For example, in each sequence, only some of the operations may be executed.

Although not particularly mentioned in each of the above-described embodiments, a program for causing a computer to execute each process performed by any one of the above-described nodes (such as the UE 100 and the eNB 200) may be provided. The program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a recording medium such as a CD-ROM and a DVD-ROM, for example.

Alternatively, a chip may be provided which includes: a memory for storing a program for performing each process performed by any one of the UE 100 and the eNB 200; and a processor) for executing the program stored in the memory.

In the above-described embodiments, an LTE system is described as an example of the mobile communication system; however, the LTE system is not an exclusive example, and the content according to the present application may be applied to a system other than the LTE system.

[Supplementary Note]

(Introduction)

V2V mobility is discussed and created the following agreements.

Mobility

Agree that there is an interruption time due to the UE acquiring reception pools in the target cell in handover.

FFS is there is a critical issue for cell reselection case and whether solutions optimizing cell reselection are necessary.

It will study mechanisms to limit the PC5 interruption time due to handover.

The UE should be allowed to start using the Tx pools before the HO is complete as long as synchronization is performed with the target cell.

As the above agreements mentioned, it is necessary to reduce the interruption time due to the UE acquiring the target cell's SIB18 during handover. The target cell's Tx/Rx resource pool information should be forwarded to the UE via the HO command to reduce the interruption time.

In this supplementary note, the details of such forwarding approach are investigated.

(Discussion)

Sidelink transmission configuration via the HO command Since Rel.12, a target cell can configure the UE with its transmission resource via the HO command. For mode-2 transmission, RAN2 agreed to reduce the HO interruption time with the following agreement; "The UE should be allowed to start using the Tx pools before the HO is complete as long as synchronization is performed with the target cell.".

On the other hand, with regards to the sidelink synchronization information for the mode-2 transmission in the HO command, the target cell can also configure the UE with the index (syncConfigIndex) of the sidelink synchronization configurations (commSyncConfig) provided in the target cell's SIB18. However, such an index is meaningless to the UE without the actual configuration (i.e., it's not SL-SyncConfig), so the UE won't be able to understand the actual sidelink synchronization configuration unless it also acquires the SIB18 in the target cell. Therefore, the HO interruption time to acquire the SIB18 cannot be reduced as long as the target cell only provides the index (syncConfigIndex) within the HO command, as it is today.

Observation: The HO interruption time to acquire the SIB18 cannot be reduced as long as the target cell only provides the index (syncConfigIndex) within the HO command.

Figure 12:
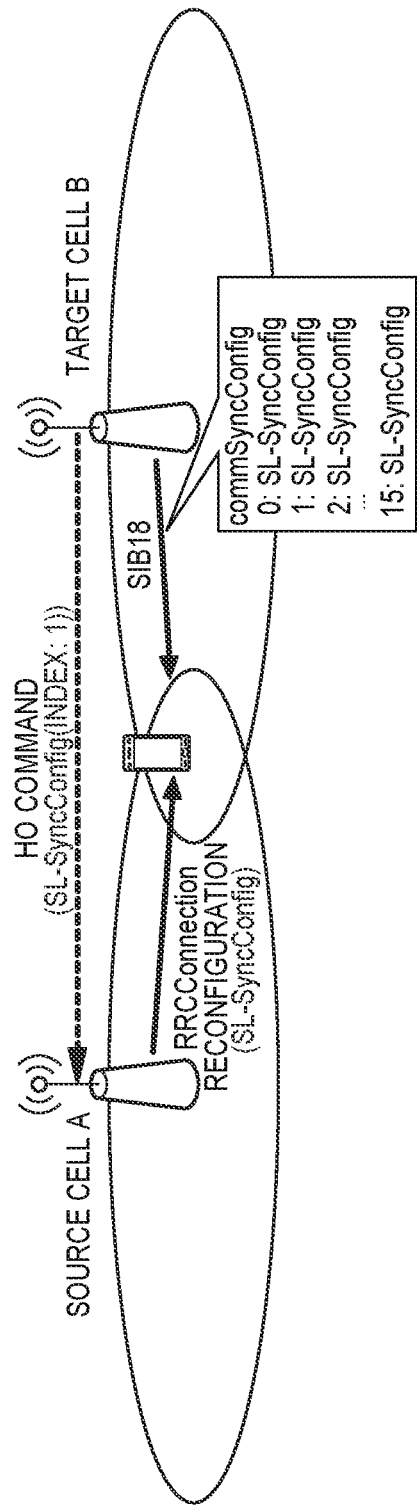
FIG. 12 is a diagram according to Additional Remark.

To minimize the HO interruption time, the target cell could provide the actual synchronization configuration (SL-SyncConfig) associated with the transmission resource or the list of the actual synchronization configurations (commSyncConfig) in the HO command, instead of using the index (syncConfigIndex) (FIG. 12). Although this alternative appears to be a straightforward solution, it does increase the message size of the HO command.

Another alternative is for the target cell to provide only the index, over the HO command. But the index is referenced to the actual sidelink synchronization configuration provided in the source cell's SIB18 (FIG. 9) as opposed to the target cell's SIB18. This alternative has the advantage that the message size of the HO command would be much smaller compared to the alternative for including the actual synchronization configuration in the HO command. The disadvantage is that this alternative requires tight network coordination between the source cell and the target cell, i.e., the source cell needs to broadcast the actual sidelink synchronization configuration associated with the target cell and the target cell needs to ensure the index provided to the source cell corresponds to the actual sidelink synchronization configuration broadcasted in the source cell's SIB18. As yet another alternative, the source cell may provide in SIB18 the index for its own sidelink synchronization configuration that also maps correctly to the target cell's actual sidelink synchronization configuration (FIG. 10). With this alternative, the target cell doesn't need to add any new parameter in the HO command, but it has impacts to the message size of the SIB18 and tight network coordination will again be needed.

Considering the complexities of all the alternatives suggested above and to avoid such tight network coordination, the target cell should just provide the actual sidelink synchronization configuration via the HO command, i.e., the first alternative as depicted in FIG. 12, although it may impact on the message size of the HO command.

It can be also considered that a source cell provides the target cell's list of the actual sidelink synchronization configurations (commSyncConfig-r12) in its SIB18, but the source cell may need to a lot of lists of sidelink synchronization configuration (commSyncConfig-r12) for the seamless mobility to the each neighbour cells, so it has impacts to the size of SIB18 and some network coordination will also be needed.

Another aspect that was pointed out in the email discussion was the option for the target cell to configure the UE with mode-1 transmission resource via the HO command, in order to reduce the HO interruption time. Some companies supported the idea that the exceptional resource for the sidelink transmission should be provided within the HO command. According to the current specification, the exceptional resource is defined as mode-2 resource and therefore it is also expected that the UE will need the sidelink synchronization configuration provided in the target cell's SIB18 before the exceptional resource can be utilized. Therefore, even if the target cell's exceptional resource is provided via the HO command, the target cell should also provide the actual sidelink synchronization configuration as well as the normal sidelink mode-2 transmission configuration.

Proposal 1; The target cell should provide in the HO command the actual sidelink synchronization configuration (e.g., SL-SyncConfig) associated with the mode-2 transmission resource including the use of the exceptional resource.

Sidelink Reception Configuration Via the HO Command

According to the above agreement, the interruption time during HO is due to acquisition of SIB18 needed for sidelink communication reception and sidelink communication transmission. Based on the result of the email discussion, majority of companies supported that the idea that the target cell configures the UE with the sidelink reception pool via the HO command, the same principle used for sidelink transmission during HO. Again, the UE will need the actual sidelink synchronization configuration broadcasted in the target cell's SIB18, before the sidelink reception resource pool provided via the HO command can be used; otherwise, the HO interruption time due to acquiring the SIB18 for the sidelink communication reception cannot be reduced.

Proposal 2: The target cell should provide in the HO command the actual sidelink synchronization configuration (e.g., SL-SyncConfig) associated with the reception resource pool.

Minimizing the Message Size of the HO Command

Even if Proposal 1 and/or Proposal 2 are agreeable for the reduction of the HO interruption time, it's unreasonable to expect that every UE will need the transmission/reception pool information associated with the target cell during HO. For example, if the UE has already acquired the target cell's SIB18, or if the UE is not interested in the critical sidelink communication which handles the delay-sensitive traffic, the additional information provided in the HO command is redundant. Therefore, to minimize the message size of the HO command, it should be discussed whether the target cell should be able to decide whether to provide the additional sidelink configuration via the HO command.

Proposal 3: It should discuss whether the target cell should be able to decide whether to provide the additional sidelink configuration via the HO command.

INDUSTRIAL APPLICABILITY

The present disclosure is useful in the mobile communication field.

The invention claimed is:

1. A user equipment comprising:
   a transmitter configured to transmit, to a first cell, information requesting radio resource for V2X sidelink communication; and
   a receiver configured to receive from the first cell, a handover command for starting a handover from the first cell to a second cell, wherein
   the handover command includes information indicating a resource pool used for transmitting the V2X sidelink communication during performing of the handover, and synchronization information indicating synchronization configuration used for transmitting a sidelink synchronization signal in the V2X sidelink communication during performing of the handover.

2. The user equipment according to claim 1, wherein
   the controller is configured to performing the handover in response to receiving the handover command, and
   the transmitter is configured to transmit the V2X sidelink communication during performing the handover by using the resource pool indicated by the handover command.

3. The user equipment according to claim 1, wherein
   the information further indicates that a type of the requested sidelink communication is V2X sidelink communication.

4. The user equipment according to claim 1, wherein
   the handover command includes the resource information and the synchronization information in response to a type of the performed sidelink communication being the V2V sidelink communication.

5. A base station comprising
   a receiver configured to receive from a user equipment, information requesting radio resource for V2X sidelink communication; and
   a transmitter configured to transmit to the user equipment, a handover command for starting a handover from a first cell to a second cell, wherein
   the handover command includes information indicating a resource pool used for transmitting the V2X sidelink communication during performing of the handover, and synchronization information indicating synchronization configuration used for transmitting a sidelink synchronization signal in the V2X sidelink communication during performing of the handover.

6. The base station according to claim 5, wherein
   the handover command includes the resource information and the synchronization information in response to a type of the performed sidelink communication being the V2V sidelink communication.

7. The base station according to claim 5, wherein
   the information further indicates that a type of the requested sidelink communication is V2X sidelink communication.

8. A method comprising:
   transmitting by a user equipment to a first cell, information requesting radio resource for V2X sidelink communication; and
   receiving by the user equipment from the first cell, a handover command for starting a handover from the first cell to a second cell, wherein
   the handover command includes information indicating a resource pool used for transmitting the V2X sidelink communication during performing of the handover, and synchronization information indicating synchronization configuration used for transmitting a sidelink synchronization signal in the V2X sidelink communication during performing of the handover.

9. The method according to claim 8, wherein
   the information further indicates that a type of the requested sidelink communication is V2X sidelink communication.

10. The method according to claim 8, wherein
    the handover command includes the resource information and the synchronization information in response to a type of the performed sidelink communication being the V2V sidelink communication.

* * * * *